United States Patent
Dhayalan et al.

(10) Patent No.: US 12,167,136 B2
(45) Date of Patent: Dec. 10, 2024

(54) METHOD AND SYSTEM FOR USING A PLURALITY OF MOTION SENSORS TO CONTROL A PAN-TILT-ZOOM CAMERA

(71) Applicant: Honeywell International Inc., Charlotte, NC (US)

(72) Inventors: Sivasanthanam Dhayalan, Thiruvannamalai (IN); Jitendra S. Chaurasia, Bengaluru (IN); Mourian Balasubramanian, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 127 days.

(21) Appl. No.: 17/711,842

(22) Filed: Apr. 1, 2022

(65) Prior Publication Data
US 2023/0319415 A1    Oct. 5, 2023

(51) Int. Cl.
*H04N 23/695*    (2023.01)
*G01P 13/00*    (2006.01)
(Continued)

(52) U.S. Cl.
CPC ........... *H04N 23/695* (2023.01); *G01P 13/00* (2013.01); *G06T 7/20* (2013.01); *G06V 20/44* (2022.01);
(Continued)

(58) Field of Classification Search
None
See application file for complete search history.

(56) References Cited

U.S. PATENT DOCUMENTS

| 7,750,936 B2 | 7/2010 | Provinsal et al. |
| 8,405,732 B2 | 3/2013 | Ahiska et al. |

(Continued)

FOREIGN PATENT DOCUMENTS

| CN | 106060141 A | 10/2016 |
| CN | 211720795 U | 10/2020 |

(Continued)

OTHER PUBLICATIONS

European Search Report, European Patent Office, EP Application No. 23163036.9, Aug. 7, 2023 (10 pages).
(Continued)

*Primary Examiner* — James M Anderson, II
(74) *Attorney, Agent, or Firm* — Seager, Tufte & Wickhem, LLP

(57) ABSTRACT

A method for controlling a PTZ camera having a controllable FOV includes detecting a first detection event by a first detector located at a first location that is along a first path in a monitored region. In response to the first detection event, the PTZ camera is automatically controlled such that the FOV of the PTZ camera includes at least part of the first detection region along the first path in the monitored region. A second detection event is detected by a second detector located at a second location that is along the first path in the monitored region, wherein the second location is spaced from the first location. In response to the second detection event, the PTZ camera is automatically controlled such that the FOV of the PTZ camera includes at least part of the second detection region along the first path in the monitored region.

10 Claims, 9 Drawing Sheets

(51) Int. Cl.
  *G06T 7/20* (2017.01)
  *G06V 20/40* (2022.01)
  *G06V 20/52* (2022.01)
  *H04N 23/61* (2023.01)
  *H04N 23/69* (2023.01)

(52) U.S. Cl.
  CPC ............. *G06V 20/52* (2022.01); *H04N 23/61* (2023.01); *H04N 23/69* (2023.01); *G06T 2207/10016* (2013.01); *G06T 2207/30201* (2013.01); *G06T 2207/30232* (2013.01); *G06T 2207/30236* (2013.01)

(56) References Cited

U.S. PATENT DOCUMENTS

| | | | |
|---|---|---|---|
| 8,754,945 | B2 | 6/2014 | Lee et al. |
| 10,937,289 | B2 | 3/2021 | King et al. |
| 2006/0126737 | A1 | 6/2006 | Boice et al. |
| 2006/0238618 | A1* | 10/2006 | Wren ................ G08B 13/196 348/143 |
| 2007/0236570 | A1 | 10/2007 | Sun et al. |
| 2012/0075468 | A1* | 3/2012 | Wu ..................... H04N 7/188 348/143 |
| 2016/0381282 | A1* | 12/2016 | Bandlamudi .......... H04N 23/62 348/240.3 |
| 2017/0315208 | A1* | 11/2017 | Sadr ..................... G01S 5/0294 |
| 2019/0306408 | A1 | 10/2019 | Hofer et al. |
| 2019/0324460 | A1* | 10/2019 | Egner ................... G06V 20/17 |
| 2020/0279238 | A1* | 9/2020 | Leake ............. G06Q 20/40145 |
| 2020/0401157 | A1 | 12/2020 | Johnston et al. |
| 2022/0272255 | A1* | 8/2022 | Xiong ................. H04N 23/695 |

FOREIGN PATENT DOCUMENTS

| | | | |
|---|---|---|---|
| CN | 214335826 | U | 10/2021 |
| EP | 2911125 | B1 | 9/2019 |
| KR | 1056018 | B1 | 8/2011 |
| KR | 20170081623 | A * | 7/2017 ........... G08B 13/196 |
| WO | 2012158017 | A1 | 11/2012 |

OTHER PUBLICATIONS

Kumar et al., Smart Home Using Visual Sensor Network and Li-Fi Technology, vol. 8, No. 4, pp. 4791-4796, Nov. 2019.

Home Security Camera, motion detection auto tracking, 2.4 ghz WiFi IP Camera, two way talk, HD 1080P,pan Tile Full Color Night Vision Waterproof Outdoor Surveillance Boavision HD22M102M, Jan. 4, 2022.

Bal, "Light Fidelity for Position Detection", pp. 1-4, vol. 3, Issue 12, Dec. 2014.

Li-Fi—The Next Big Thing In The World of LED Lights., pp. 1-6, Jan. 19, 2022.

LiFi: Delivery of LiFi-compatible devices—Oledcomm, pp. 1-8, Jan. 19, 2022.

LiFi Components—pure LiFi—Welcome to Immersive Connectivity, pp. 1-15, Jan. 19, 2022.

Signify Reports Rush To Trial LiFi, https://www.signify.com/en-id/our-company/news/press-releases/2019/20190306-signify-reports-rushtotrial-lifi, pp. 1-7, Jan. 19, 2022.

Two Gujarat Villages First In India to Get LiFi, https://timesofindia.indiatimes.com/city/ahmedabad/2-gujarat-villages-first-in-india-to-get-lifi/articleshow/81080015.cms, pp. 1-15, Jan. 19, 2022.

* cited by examiner

From FIG 5A →

74 — Detecting a third detection event by a third detector located at a third location that is along a second path in the monitored region, the third detection event corresponding to the third detector detecting a second object in a third detection region along the second path, wherein the second path has a higher priority than the first path

76 — In response to the third detection event, ceasing to automatic control the PTZ camera in response to the first detection event and/or the second detection event, and instead automatically control the PTZ camera such that the FOV of the PTZ camera includes at least part of the third detection region along the second path in the monitored region

78 — Detecting a fourth detection event by a fourth detector that is along the second path in a monitored region, the fourth detection event corresponding to the fourth detector detecting the second object in a fourth detection region along the second path

80 — In response to the fourth detection event, automatically controlling the PTZ camera such that the FOV of the PTZ camera includes at least part of the fourth detection region along the second path in the monitored region

FIG. 5B

METHOD AND SYSTEM FOR USING A PLURALITY OF MOTION SENSORS TO CONTROL A PAN-TILT-ZOOM CAMERA

TECHNICAL FIELD

The present disclosure pertains generally to video systems and more particularly to controlling a camera within a video system.

BACKGROUND

Many security systems utilize pan-tilt-zoom (PTZ) cameras to provide video images of events that occur within a space that is monitored by the security system. Because PTZ cameras have an adjustable field of view (FOV), a single PTZ camera may be used to cover two or more different areas, such as down a first hallway and down a second hallway, for example. If an event occurs within the first hallway while the PTZ camera has its FOV focused down the second hallway, the PTZ camera may not capture the event occurring in the first hallway. A need remains for improved methods of controlling PTZ cameras in order to capture relevant events within a space.

SUMMARY

The present disclosure pertains generally to video systems and more particularly to controlling a camera within a video system. An example may be found in a method for controlling a PTZ camera having a controllable FOV. The illustrative method includes detecting a first detection event by a first detector located at a first location that is along a first path in a monitored region, the first detection event corresponding to the first detector detecting a first object in a first detection region along the first path. In response to the first detection event, the PTZ camera is automatically controlled such that the FOV of the PTZ camera includes at least part of the first detection region along the first path in the monitored region. A second detection event is detected by a second detector located at a second location that is along the first path in the monitored region, wherein the second location is spaced from the first location. The second detection event corresponding to the second detector detecting the first object in a second detection region along the first path, wherein the second detection region is spaced from the first detection region. In response to the second detection event, the PTZ camera is automatically controlled such that the FOV of the PTZ camera includes at least part of the second detection region along the first path in the monitored region.

Another example may be found in a method for controlling a pan-tilt-zoom (PTZ) camera with a controllable field of view (FOV). The illustrative method includes detecting via one or more motion detectors a first object in a first area of a monitored region. In response to detecting the first object in the first area, the PTZ camera is automatically controlled such that the FOV of the PTZ camera tracks the first object. One or more motion detectors then detect a second object in a second area of the monitored region, wherein the second area has a higher priority than the first area. In response to detecting the second object in the second area, the PTZ camera is no longer controlled such that the FOV of the PTZ camera tracks the first object, and instead the PTZ camera is automatically controlled such that the FOV of the PTZ camera tracks the second object in the second area.

Another example may be found in a non-transient computer readable medium having instructions stored thereon. When the instructions are executed by one or more processors, the one or more processors are caused to receive a first detection event corresponding to a first object in a first area of a monitored region, and in response to receiving the first detection event, automatically send control commands for use by a PTZ camera such that the FOV of the PTZ camera tracks the first object. The one or more processors are also caused to receive a second detection event corresponding to a second object in a second area of the monitored region, wherein the second area has a higher priority than the first area, and in response to receiving the second detection event, automatically send control commands for use by the PTZ camera such that the FOV of the PTZ camera ceases to track the first object and starts tracking the second object in the second area.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 5A and 5B are flow diagrams that together show an illustrative method;

Figure 1:
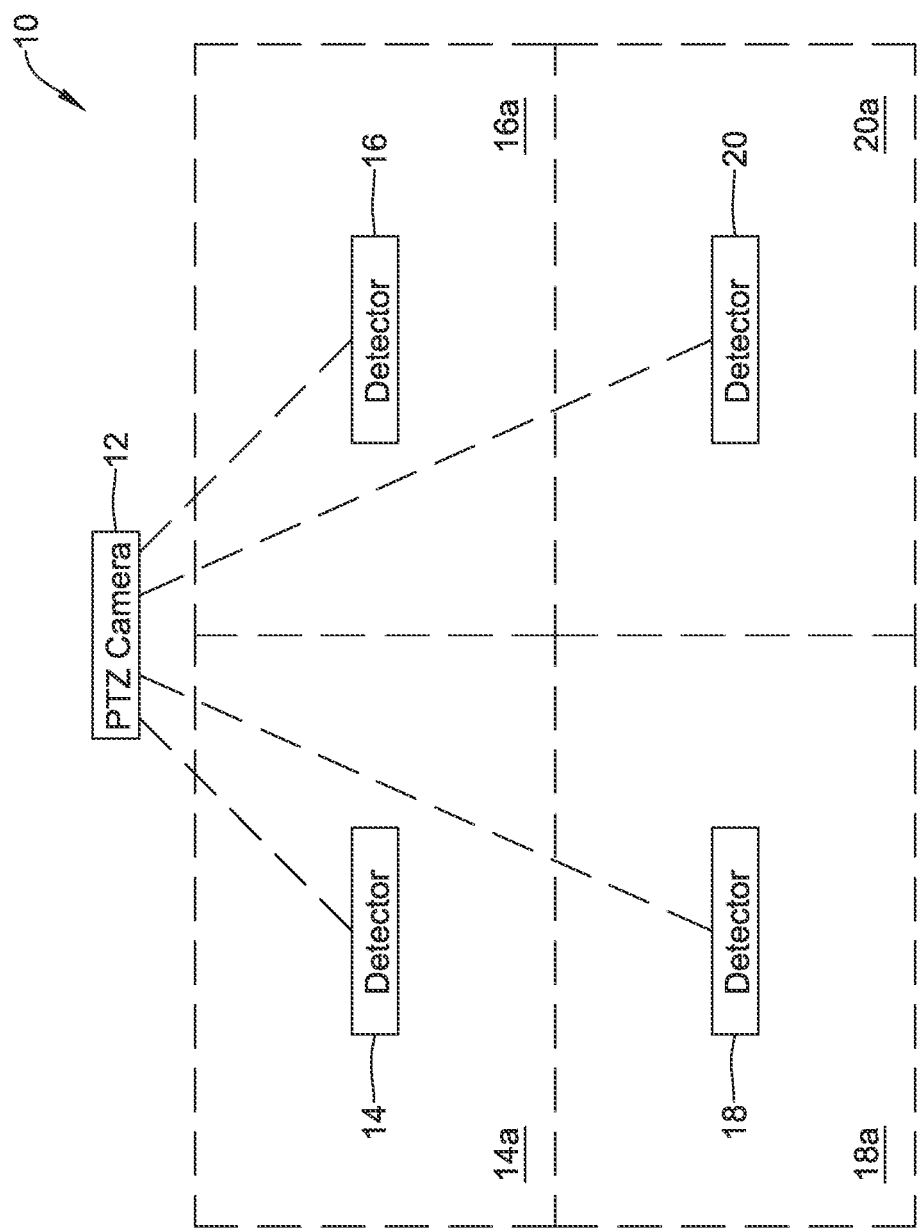
FIG. 1 is a schematic block diagram of an illustrative security system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative security system 10. The illustrative security system 10 includes a PTZ camera 12. The PTZ camera 12 is configured to have an adjustable field of view by changing one or more of a pan setting, a tilt setting and a zoom setting. While a single PTZ camera 12 is shown, it will be appreciated that the security system 10 may include a plurality of PTZ cameras 12, with each of the PTZ cameras 12 having a particular FOV. In some cases, the PTZ camera 12 may have just one or two of a pan setting, a tilt setting and a zoom setting (e.g. P, T, Z, PZ, PT, TZ, etc.).

As shown in FIG. 1, the PTZ camera 12 is operably coupled with a detector 14 that is within an area 14a, a detector 16 that is within an area 16a, a detector 18 that is within an area 18a and a detector 20 that is within an area 20a. While the areas 14a, 16a, 18a and 20a are schematically shown as being rectilinear in shape, it will be appreciated that this is merely illustrative. In some cases, each of the areas 14a, 16a, 18a and 20a may represent portions of a larger space, such as a factory floor, for example. In some cases, one or more of the areas 14a, 16a, 18a and 20a may have a different shape, depending on what the actual physical space looks like. For example, the area 14a and the area 16a may each be offices while the area 18a represents a hallway extending between the two offices, or perhaps in front of the two offices. While each of the areas 14a, 16a, 18a and 20a are shown with a single detector 14, 16, 18 and 20, it will be appreciated that depending on the size of a particular area and/or the shape of the particular area, some or all of the areas 14a, 16a, 18a and 20a may include two detectors, or even three detectors or more.

The detectors 14, 16, 18 and 20 may each be any of a variety of different types of object and/or motion detectors. In some cases, at least some of the detectors 14, 16, 18 and 20 may be PIR (passive infra-red) motion detectors. If one of the detectors 14, 16, 18 and 20 senses motion in their respective area, the detector sensing motion can notify the PTZ camera 12 accordingly. In some instances, the PTZ camera 12 can adjust one or more of its pan, tilt and zoom settings in order to change its FOV so that the particular area in which a detector detected motion can be viewed by the PTZ camera 12. In some cases, each of the detectors 14, 16, 18 and 20 may be connected to the PTZ camera 12 via a wired or wireless network.

Figure 2:
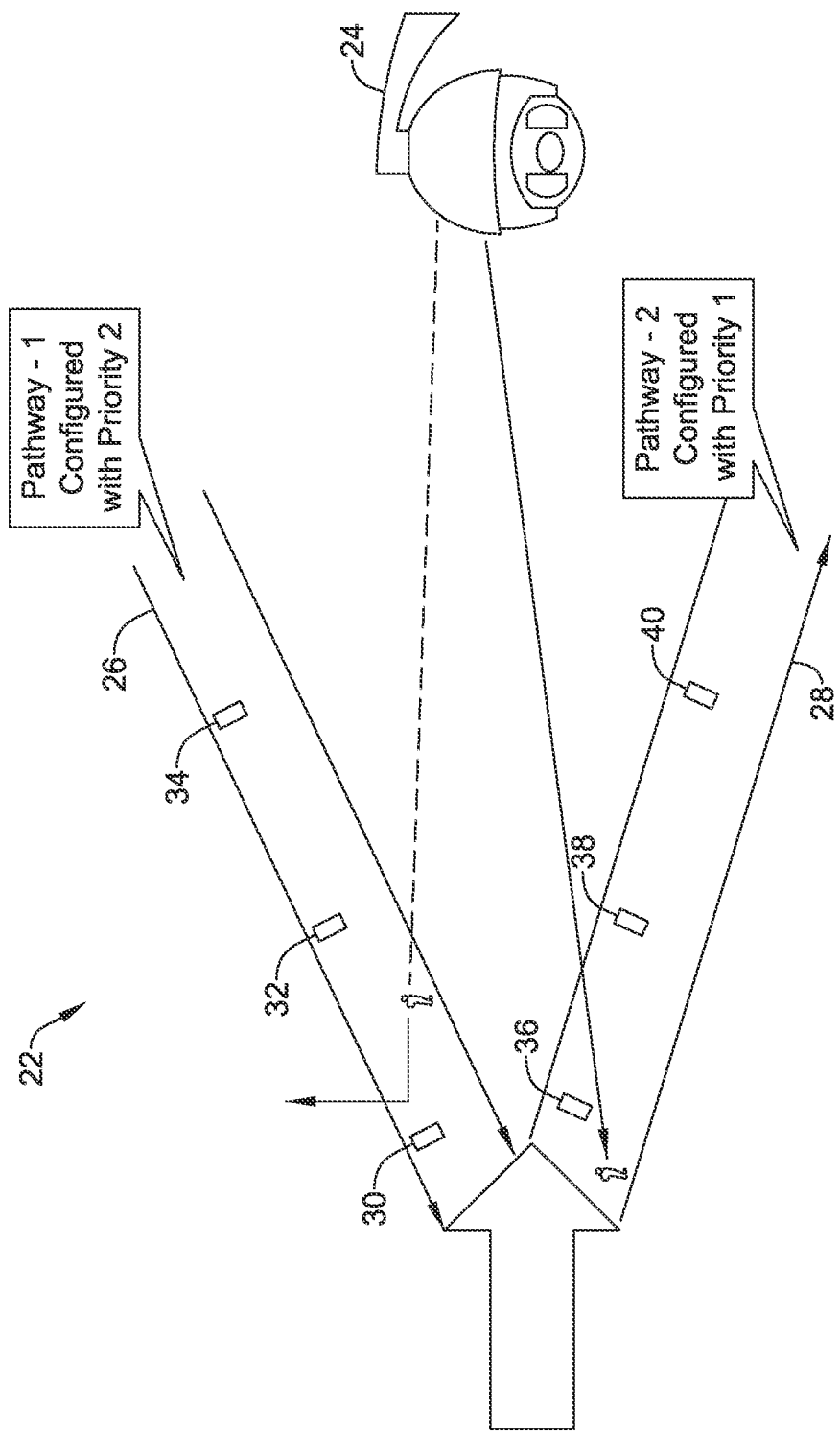
FIG. 2 is a schematic diagram of an illustrative security system.

FIG. 2 is a schematic diagram of an illustrative security system 22. The illustrative security system 22 includes a PTZ camera 24. The PTZ camera 24 is configured to have an adjustable field of view by changing one or more of a pan setting, a tilt setting and a zoom setting. While a single PTZ camera 24 is shown, it will be appreciated that the security system 22 may include a plurality of PTZ cameras 24, with each of the PTZ cameras 24 having a particular FOV. As shown, the security system 22 is configured to monitor a first pathway 26 and a second pathway 28. The first pathway 26 may be a hallway extending north within a building while the second pathway 28 may be a hallway extending west from one end of the north-extending hallway, for example. In some instances, the first pathway 26 may be a sidewalk extending along a south side of a building while the second pathway 28 may be a sidewalk extending along the east side of the building.

In some cases, one of the pathways 26 and 28 may have a relatively higher priority assigned to it while the other of the pathways 26 and 28 may have a relatively lower priority assigned to it. As shown, the first pathway 26 has a priority level of two (2) assigned and the second pathway 28 has a priority level of one (1) assigned, where a priority level of one (1) is considered a higher priority than a priority level of two (2). In some cases, the second pathway 28 may have higher security offices located along the second pathway 28, for example. In some cases, the second pathway 28 may be more heavily trafficked.

Accordingly, if there is motion detected along the first pathway 26, but no motion detected along the second pathway 28 (e.g. by respective motion detectors), the PTZ camera 24 may changes its FOV to be able to see the motion along the first pathway 26, even though the first pathway 26 has a lower priority level. If motion is detected along both the first pathway 26 and the second pathway 28, and the relative position of the motion along each of the pathways 26 and 28 is positioned such that the PTZ camera 24 is not able to hold both sources of motion within its FOV, the PTZ camera 24 will be directed on the second pathway 28 because the second pathway 28 has a higher priority level (e.g. priority level of one).

The illustrative security system 22 includes a number of motion detectors, including motion detectors 30, 32 and 34 disposed along the first pathway 26 and motion detectors 36, 38 and 40 disposed along the second pathway 28. Each of the motion detectors 30, 32, 34, 36, 38 and 40 may communicate with the PTZ camera 24 via a wired or wireless network, for example. In some cases, the PTZ camera 24 may also be configured to adjust one or more of its pan, tilt and zoom settings in order to capture motion along other pathways as well. In some cases, one or more of the motion detectors 30, 32, 34, 36, 38 and 40 may include one or more of a PIR detector, a microwave detector, an ultrasonic detector, a tomographic detector, a beam break detector and/or any combination thereof. In some cases, one or more of the motion detectors 30, 32, 34, 36, 38 and 40 may include a beam break detector, wherein the beam break detector uses a LiFi encoded beam. A monitored region may include a plurality of light fixtures for lighting the monitored region, and one or more of the motion detectors may be incorporated into one or more of the plurality of light fixtures. These are just examples.

Figure 3:
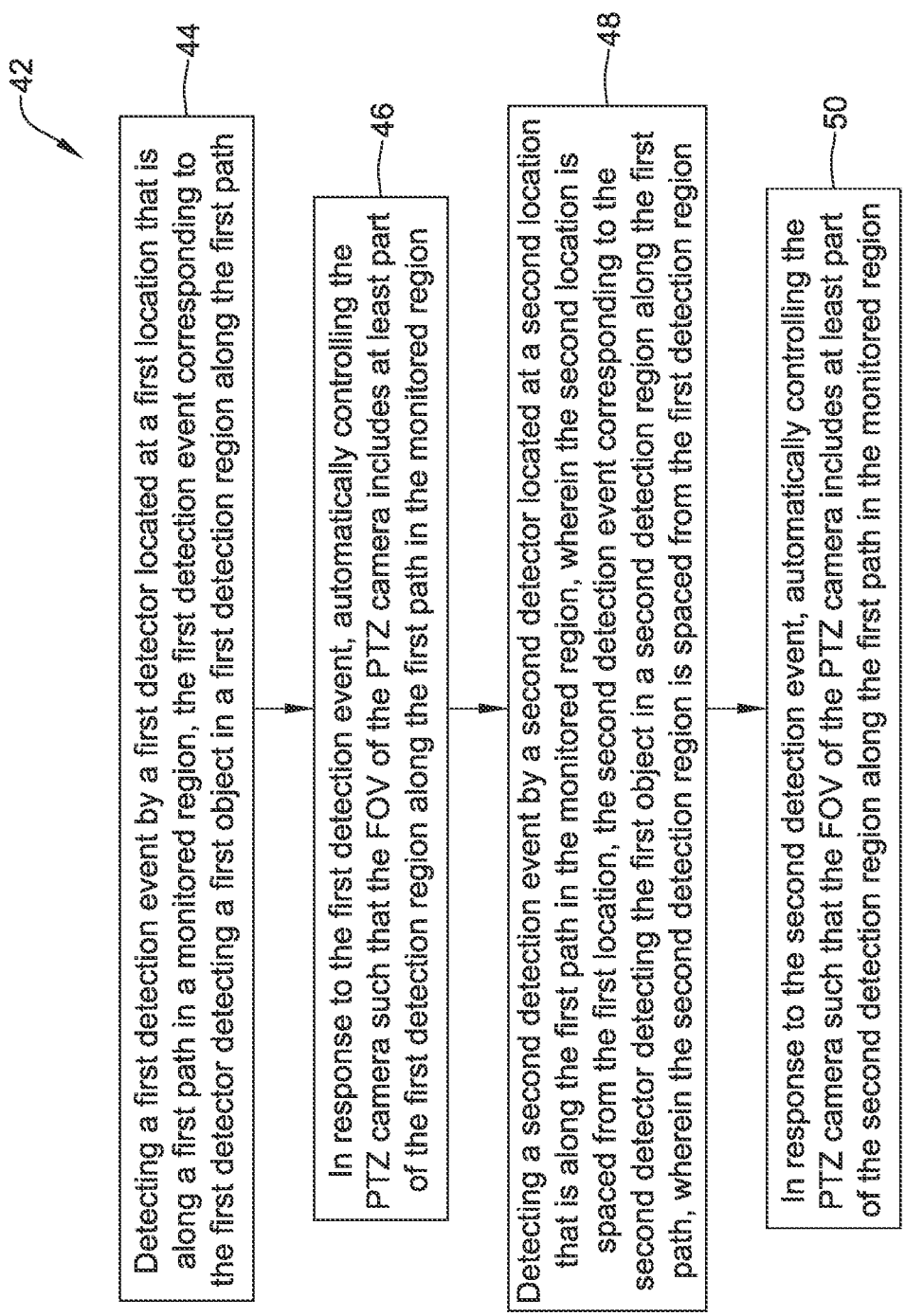
FIG. 3 is a flow diagram showing an illustrative method.

FIG. 3 is a flow diagram showing an illustrative method 42 for controlling a pan-tilt-zoom (PTZ) camera (such as the PTZ camera 12 or the PTZ camera 24) with a controllable field of view (FOV). The method 42 includes detecting a first detection event by a first detector located at a first location that is along a first path in a monitored region, the first detection event corresponding to the first detector detecting a first object in a first detection region along the first path, as indicated at block 44. In response to the first detection event, the PTZ camera is automatically controlled such that the FOV of the PTZ camera includes at least part of the first detection region along the first path in the monitored region, as indicated at block 46. In some cases, automatically controlling the PTZ camera includes zooming in the FOV of the PTZ camera in order to capture a closer-up view of the first object in the first detection region (e.g. face).

A second detection event is detected by a second detector located at a second location that is along the first path in the monitored region, wherein the second location is spaced from the first location. In this example, the second detection event corresponds to the second detector detecting the first object in a second detection region along the first path, wherein the second detection region is spaced from the first detection region, as indicated at block 48. In response to the second detection event, the PTZ camera is automatically controlled such that the FOV of the PTZ camera includes at least part of the second detection region along the first path in the monitored region, as indicated at block 50. In some cases, automatically controlling the PTZ camera includes zooming in the FOV of the PTZ camera in order to capture a closer-up view of the first object in the second detection region.

In some instances, the first detector and the second detector may both be motion detectors that are part of a plurality of motion detectors. The method 42 may further include automatically controlling the PTZ camera in accordance with one or more preset non-event settings when no events are detected by any of the plurality of motion detectors. Examples of the one or more preset settings include one or more of a pan setting, a zoom setting, a tilt setting, a resolution setting, a frame rate setting and a bit rate setting. In some cases, the PTZ camera may change the preset non-event settings in accordance with a preset non-event schedule, causing the PTZ camera to scan over time both the first detection region and the second detection region.

In some cases, the method 42 may further include automatically changing one or more of the preset non-event settings to one or more event settings when one or more events are detected by one or more of the plurality of motion detectors and automatically controlling the PTZ camera in accordance with the one or more event settings when one or more events are detected by one or more of the plurality of motion detectors.

In some cases, the illustrative method 42 may further include concurrently detecting two or more objects along the first path in the monitored region, the two or more objects including the first object, and in response to detecting the two or more objects along the first path, automatically controlling the PTZ camera such that the FOV of the PTZ camera includes each of the two or more objects if possible. Automatically controlling the PTZ camera such that the FOV of the PTZ camera includes each of the two or more objects may include zooming out the FOV of the PTZ camera to includes each of the two or more objects.

Figure 4:
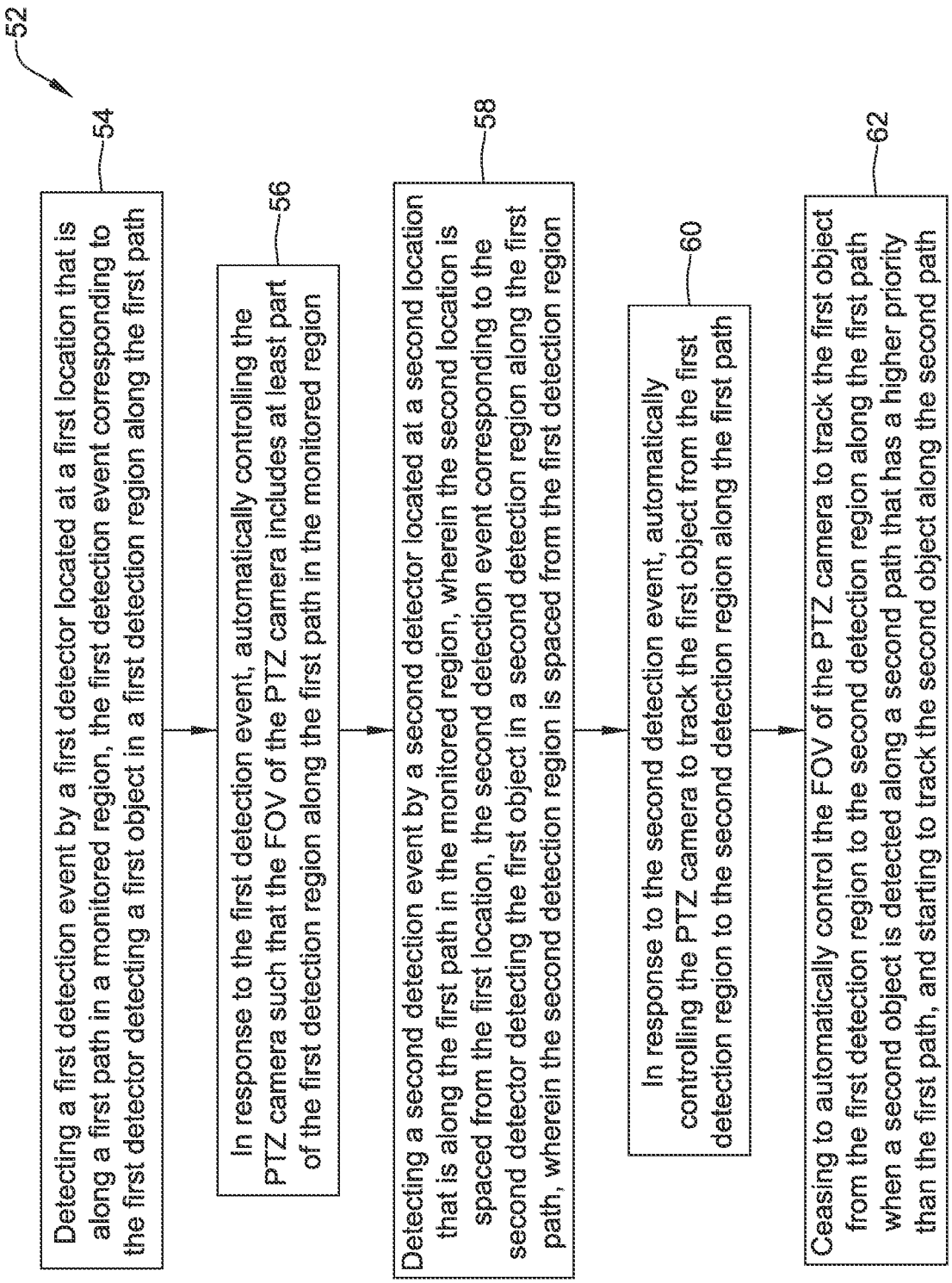
FIG. 4 is a flow diagram showing an illustrative method.

FIG. 4 is a flow diagram showing an illustrative method 52 for controlling a pan-tilt-zoom (PTZ) camera (such as the PTZ camera 12 or the PTZ camera 24) with a controllable field of view (FOV). The illustrative method 52 includes detecting a first detection event by a first detector located at a first location that is along a first path in a monitored region, the first detection event corresponding to the first detector detecting a first object in a first detection region along the first path, as indicated at block 54. In response to the first detection event, the PTZ camera is automatically controlled such that the FOV of the PTZ camera includes at least part of the first detection region along the first path in the monitored region, as indicated at block 56. In some cases, automatically controlling the PTZ camera includes zooming in the FOV of the PTZ camera in order to capture a closer-up view of the first object in the first detection region. Automatically controlling the PTZ camera may also include increase the resolution, the frame rate (Frames-Per-Second, FPS) and/or bit rate of the PTZ camera.

In the illustrative method, a second detection event is detected by a second detector located at a second location that is along the first path in the monitored region, wherein the second location is spaced from the first location. The second detection event corresponds to the second detector detecting the first object in a second detection region along the first path, wherein the second detection region is spaced from the first detection region, as indicated at block 58. In response to the second detection event, the PTZ camera is automatically controlled such that the FOV of the PTZ camera includes at least part of the second detection region along the first path in the monitored region, as indicated at block 60. In some cases, automatically controlling the PTZ camera includes zooming in the FOV of the PTZ camera in order to capture a closer-up view of the first object in the second detection region. Automatically controlling the PTZ camera may also include increase the resolution, the frame rate (Frames-Per-Second, FPS) and/or bit rate of the PTZ camera.

In some cases, the method 52 may further include automatically controlling the FOV of the PTZ camera to track the first object from the first detection region to the second detection region along the first path. In some instances, the method 52 may further include ceasing to automatically control the FOV of the PTZ camera to track the first object from the first detection region to the second detection region along the first path when a second object is detected along a second path that has a higher priority than the first path, and starting to track the second object along the second path, as indicated at block 62.

In some instances, the first detector and the second detector may both be motion detectors that are part of a plurality of motion detectors. The method 62 may further include automatically controlling the PTZ camera in accordance with one or more preset non-event settings when no events are detected by any of the plurality of motion detectors. Examples of the one or more preset settings include one or more of a pan setting, a zoom setting, a tilt setting, a resolution setting, a frame rate setting and a bit rate setting. In some cases, the PTZ camera may change the preset non-event settings in accordance with a preset non-event schedule, causing the PTZ camera to scan over time both the first detection region and the second detection region.

In some cases, the illustrative method 62 may further include automatically changing one or more of the preset non-event settings to one or more event settings when one or more events are detected by one or more of the plurality of motion detectors and automatically controlling the PTZ camera in accordance with the one or more event settings when one or more events are detected by one or more of the plurality of motion detectors.

In some cases, the illustrative method 62 may further include concurrently detecting two or more objects along the first path in the monitored region, the two or more objects including the first object, and in response to detecting the two or more objects along the first path, automatically controlling the PTZ camera such that the FOV of the PTZ camera includes each of the two or more objects if possible. Automatically controlling the PTZ camera such that the FOV of the PTZ camera includes each of the two or more objects may include zooming out the FOV of the PTZ camera to includes each of the two or more objects.

Figure 5A:
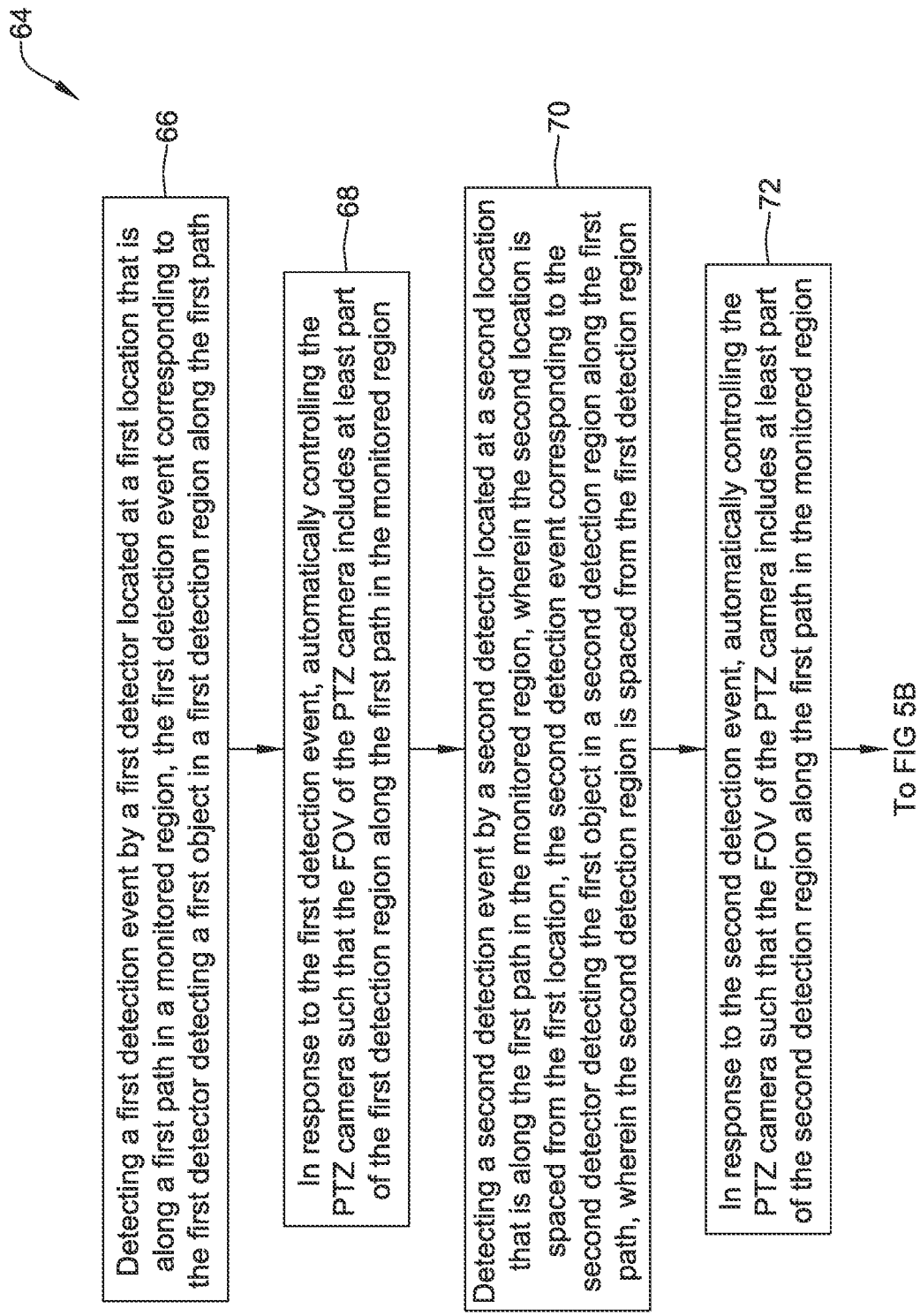

FIGS. 5A and 5B are flow diagrams that together show an illustrative method 64 for controlling a pan-tilt-zoom (PTZ) camera (such as the PTZ camera 12 or the PTZ camera 24) with a controllable field of view (FOV). The illustrative method 42 includes detecting a first detection event by a first detector located at a first location that is along a first path in a monitored region, the first detection event corresponding to the first detector detecting a first object in a first detection region along the first path, as indicated at block 66. In response to the first detection event, the PTZ camera is automatically controlled such that the FOV of the PTZ camera includes at least part of the first detection region along the first path in the monitored region to capture the first object, as indicated at block 68. In some cases, automatically controlling the PTZ camera includes zooming in the FOV of the PTZ camera in order to capture a closer-up view of the first object in the first detection region.

A second detection event is detected by a second detector located at a second location that is along the first path in the monitored region, wherein the second location is spaced from the first location. The second detection event corresponds to the second detector detecting the first object in a second detection region along the first path, wherein the second detection region is spaced from the first detection region, as indicated at block 70. In response to the second detection event, the PTZ camera is automatically controlled such that the FOV of the PTZ camera includes at least part of the second detection region along the first path in the monitored region, as indicated at block 72. In some cases, automatically controlling the PTZ camera includes zooming in the FOV of the PTZ camera in order to capture a closer-up view of the first object in the second detection region.

In this illustrative method, and continuing on FIG. 5B, a third detection event is detected by a third detector located at a third location that is along a second path in the monitored region. The third detection event corresponds to the third detector detecting a second object in a third detection region along the second path, wherein the second path has a higher priority than the first path, as indicated at block 74. In response to the third detection event, the PTZ camera is no longer automatically controlled in response to the first detection event and/or the second detection event, and instead is automatically controlled such that the FOV of the PTZ camera includes at least part of the third detection region along the second path in the monitored region to capture the second object, as indicated at block 76.

A fourth detection event is detected by a fourth detector located at a fourth location that is along the second path in the monitored region. The fourth detection event corresponds to the fourth detector detecting the second object in a fourth detection region along the second path, as indicated at block 78. In response to the fourth detection event, the PTZ camera is automatically controlled such that the FOV of the PTZ camera includes at least part of the fourth detection region along the second path in the monitored region, as indicated at block 80.

In some instances, the first detector and the second detector may both be motion detectors that are part of a plurality of motion detectors. The method 64 may further include automatically controlling the PTZ camera in accordance with one or more preset non-event settings when no events are detected by any of the plurality of motion detectors. Examples of the one or more preset settings include one or more of a pan setting, a zoom setting, a tilt setting, a resolution setting, a frame rate setting and a bit rate setting. In some cases, the PTZ camera may change the preset non-event settings in accordance with a preset non-event schedule, causing the PTZ camera to scan over time both the first detection region, the second detection region, the third detection region and the fourth detection region.

In some cases, the method 64 may further include automatically changing one or more of the preset non-event settings to one or more event settings when one or more events are detected by one or more of the plurality of motion detectors and automatically controlling the PTZ camera in accordance with the one or more event settings when one or more events are detected by one or more of the plurality of motion detectors.

In some cases, the method 64 may further include concurrently detecting two or more objects along the first path in the monitored region, the two or more objects including the first object, and in response to detecting the two or more objects along the first path, automatically controlling the PTZ camera such that the FOV of the PTZ camera includes each of the two or more objects if possible. Automatically controlling the PTZ camera such that the FOV of the PTZ camera includes each of the two or more objects may include zooming out the FOV of the PTZ camera to includes each of the two or more objects.

Figure 6:
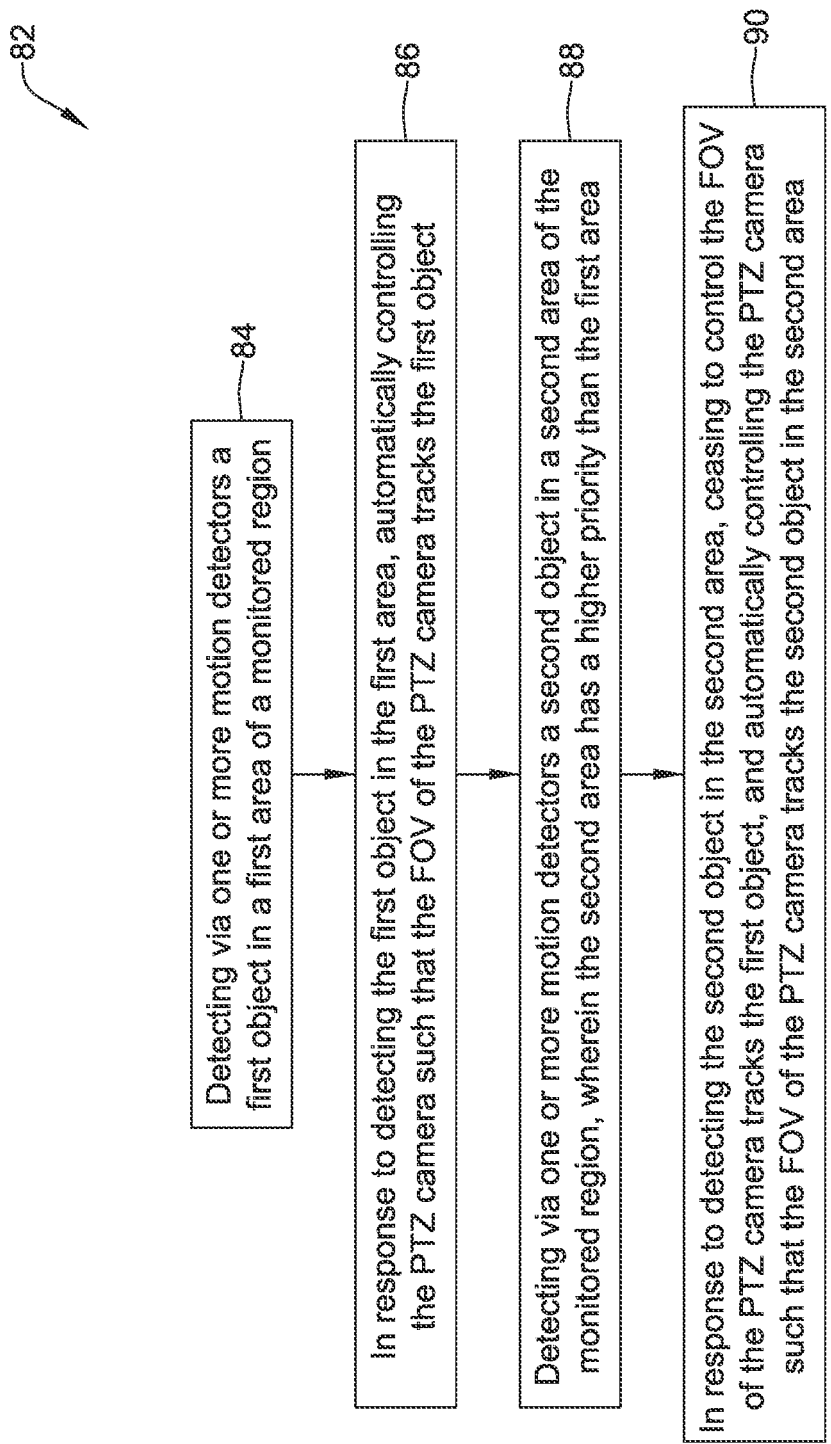
FIG. 6 is a flow diagram showing an illustrative method.

FIG. 6 is a flow diagram showing an illustrative method 82 for controlling a pan-tilt-zoom (PTZ) camera (such as the PTZ camera 12 or the PTZ camera 24) with a controllable field of view (FOV). The illustrative method 82 includes detecting via one or more motion detectors a first object in a first area of a monitored region, as indicated at block 84. In response to detecting the first object in the first area, the PTZ camera is automatically controlled such that the FOV of the PTZ camera tracks the first object, as indicated at block 86. A second object is detected in a second area of the monitored region via one or more motion detectors, wherein the second area has a higher priority than the first area, as indicated at block 88. In response to detecting the second object in the second area, the PTZ camera is no longer controlled such that the FOV of the PTZ camera tracks the first object, and instead is automatically controlled such that the FOV of the PTZ camera tracks the second object in the second area, as indicated at block 90.

In some instances, automatically controlling the PTZ camera such that the FOV of the PTZ camera tracks the first object includes zooming in the FOV of the PTZ camera to capture a closer up view of the first object. In some cases, for at least part of a time that the PTZ camera is automatically controlled such that the FOV of the PTZ camera tracks the first object, the FOV of the PTZ camera does not capture at least part of the second area.

In some instances, the one or more motion detectors include one or more of a PIR detector, a microwave detector, an ultrasonic detector, a tomographic detector, a beam break detector and/or any combination thereof. In some cases, the one or more motion detectors may include a beam break detector, wherein the beam break detector uses a LiFi encoded beam. A monitored region may include a plurality of light fixtures for lighting the monitored region, and one or more of the motion detectors may be incorporated into one or more of the plurality of light fixtures.

Figure 7:
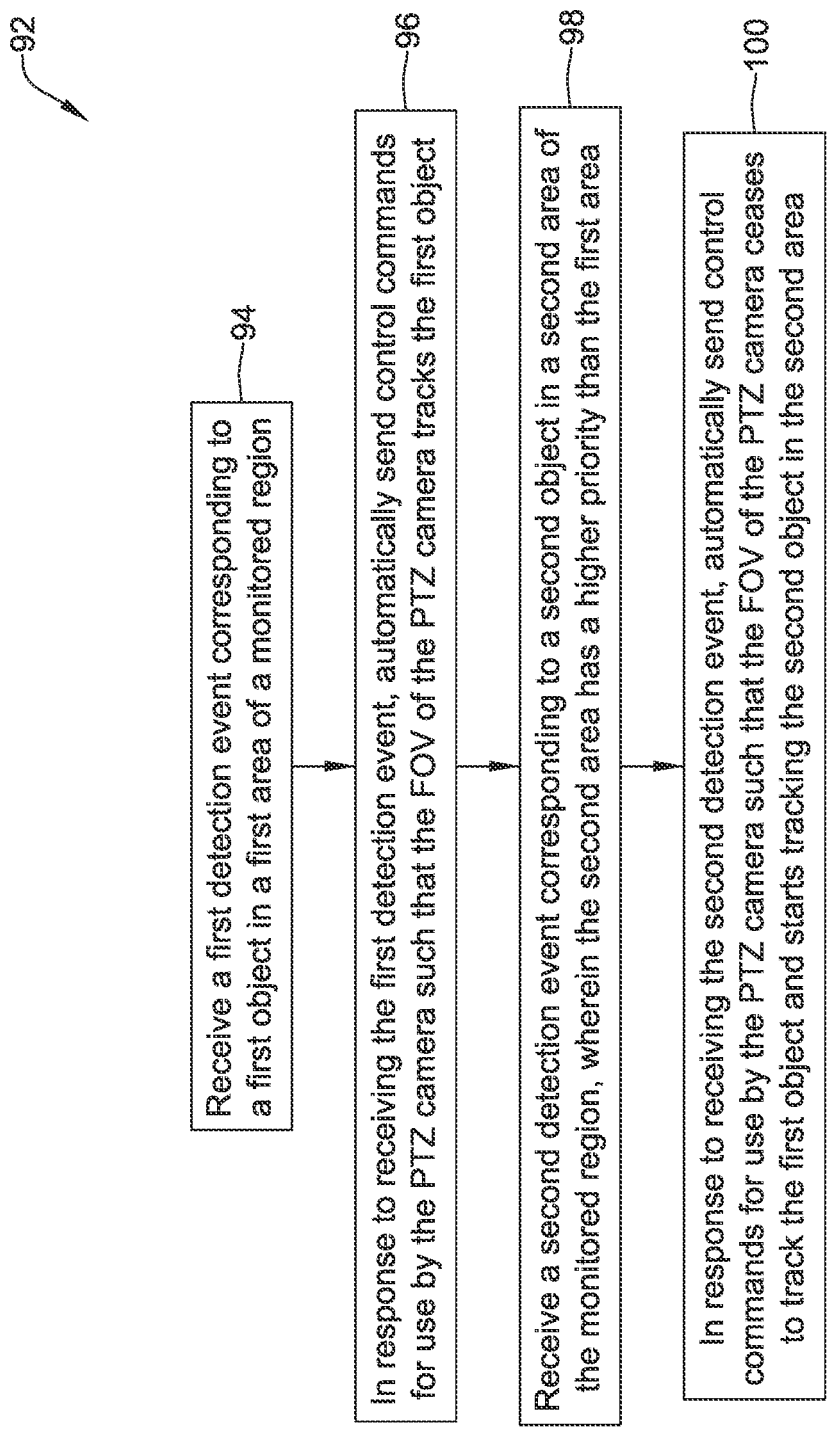
FIG. 7 is a flow diagram showing an illustrative series of actions.

FIG. 7 is a flow diagram showing an illustrative series of actions 92 that may be carried out by one or more processors that are executing instructions that are stored on a non-transient computer-readable storage medium. The one or more processors are caused to receive a first detection event corresponding to a first object in a first area of a monitored region, as indicated at block 94. The one or more processors are caused to, in response to receiving the first detection event, automatically send control commands for use by a PTZ camera such that the FOV of the PTZ camera tracks the first object, as indicated at block 96. The one or more processors are caused to receive a second detection event corresponding to a second object in a second area of the monitored region, wherein the second area has a higher priority than the first area, as indicated at block 98. The one or more processors are caused to, in response to receiving the second detection event, automatically send control commands for use by the PTZ camera such that the FOV of the PTZ camera ceases to track the first object and starts tracking the second object in the second area, as indicated at block 100.

In some cases, automatically sending control commands for use by a PTZ camera such that the FOV of the PTZ camera tracks the first object includes one or more control commands to zoom in the FOV of the PTZ camera to capture a closer up view of the first object. As an example, the first object may be a person, and the closer up view includes a face of the person. The first object may be a vehicle, and the closer up view may include a driver, or perhaps a license plate of the vehicle. Automatically sending control commands to the PTZ camera may also include increase the resolution, the frame rate (Frames-Per-Second, FPS) and/or bit rate of the PTZ camera. In some cases, for at least part of a time that the PTZ camera is tracking the first object, the FOV of the PTZ camera does not capture at least part of the second area.

Figure 8:
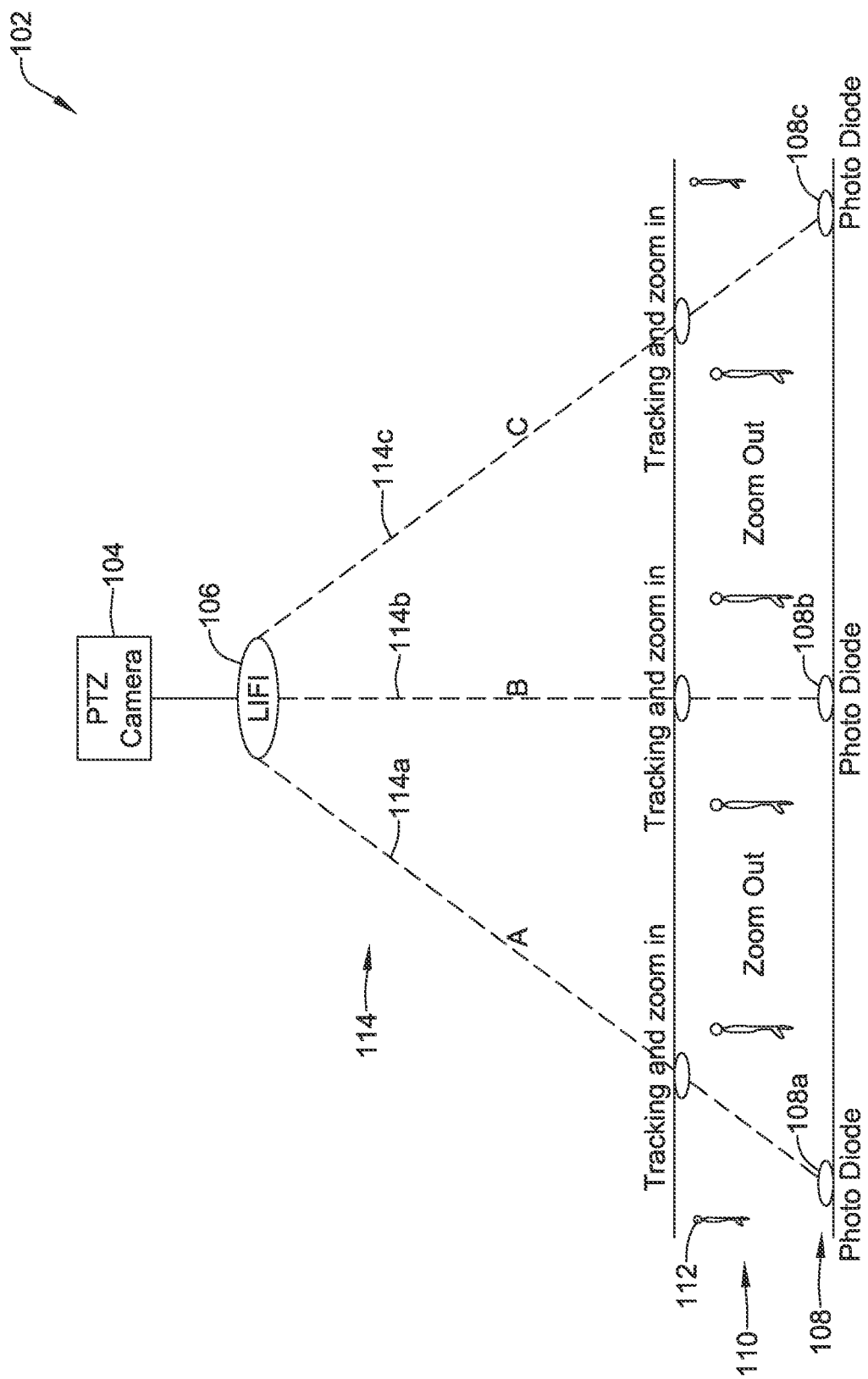
FIG. 8 is a schematic view of an illustrative security system.

FIG. 8 is a schematic view of an illustrative security system 102. The illustrative security system 102 includes a PTZ camera 104 that is operably coupled with a LiFi source 106. A number of photodiodes 108, individually labeled as 108a, 108b and 108c, are laid out along a pathway 110. The LiFi source 106 outputs an optical signal 114, illustrated as individual light beams 114a, 144b and 114c, that is captured by each of the photodiodes 108. The optical signal 114 may be a wide angle broadcast optical signal that is broadcast to all of the photodiodes 108, or the optical signal 114 may include individual light beams 114a, 144b and 114c directed at each of the individual photodiodes 108a, 108b and 108c. In the latter case, it will be appreciated that the number of light beams 114a, 144b and 114c may vary as the number of photodiodes 108 varies. As an object such as a person 112 moves down the pathway 110, the person 112 will intermittently interrupt the reception of the light signal or individual light beams 114a, 144b and 114c at each of the photodiodes 108. The individual photodiodes 108a, 108b and 108c may identify each of these interruptions, thereby identifying the current location of the person 112 along the pathway 110, and communicate corresponding signals for use by the LiFi source 106. The LiFi source 106 may then inform the PTZ camera 104 of the current location of the person 112, and the PTZ camera 104 is able to adjust its pan and/or tilt and/or increase its zoom in order to capture imagery of the person 112. After a brief period of time, the PTZ camera 104 may zoom back out until a next photodiode 108a, 108b and 108c detects a subsequent interruption, and the process continues.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for controlling a pan-tilt-zoom (PTZ) camera with a controllable field of view (FOV), the method comprising:
   detecting a first detection event by a first detector located at a first location that is along a first path in a monitored region, the first detection event corresponding to the first detector detecting a first object in a first detection region along the first path;
   in response to the first detection event, automatically controlling the PTZ camera such that the FOV of the PTZ camera includes at least part of the first detection region along the first path in the monitored region;
   detecting a second detection event by a second detector located at a second location that is along the first path in the monitored region, wherein the second location is spaced from the first location, the second detection event corresponding to the second detector detecting the first object in a second detection region along the first path, wherein the second detection region is spaced from the first detection region;
   in response to the second detection event, automatically controlling the PTZ camera such that the FOV of the PTZ camera includes at least part of the second detection region along the first path in the monitored region;
   wherein the monitored region includes a Light Fidelity (LiFi) source for emitting a LiFi encoded optical signal; and
   wherein the first detector includes a beam break detector that detects a beam break caused by the first object in the LiFi encoded optical signal, and communicates corresponding signals for use by the LiFi source to identify that the first object is in the first detection region along the first path.

2. The method of claim 1, further comprising automatically controlling the FOV of the PTZ camera to track the first object from the first detection region to the second detection region along the first path.

3. The method of claim 2, further comprising ceasing to automatically control the FOV of the PTZ camera to track the first object from the first detection region to the second detection region along the first path when a second object is detected along a second path that has a higher priority than the first path, and starting to track the second object along the second path.

4. The method of claim 1, further comprising:
   detecting a third detection event by a third detector located at a third location that is along a second path in the monitored region, the third detection event corresponding to the third detector detecting a second object in a third detection region along the second path, wherein the second path has a higher priority than the first path; and
   in response to the third detection event, ceasing to automatic control the PTZ camera in response to the first detection event and/or the second detection event, and instead automatically control the PTZ camera such that the FOV of the PTZ camera includes at least part of the third detection region along the second path in the monitored region.

5. The method of claim 4, further comprising:
   detecting a fourth detection event by a fourth detector located at a fourth location that is along the second path in the monitored region, the fourth detection event corresponding to the fourth detector detecting the second object in a fourth detection region along the second path; and in response to the fourth detection event, automatically controlling the PTZ camera such that the FOV of the PTZ camera includes at least part of the fourth detection region along the second path in the monitored region.

6. The method of claim 1, wherein automatically controlling the PTZ camera includes zooming in the FOV of the PTZ camera to capture a closer up view of the first object.

7. The method of claim 1, wherein first detector and the second detector are motion detectors that are part of a plurality of motion detectors, the method further comprises:

automatically controlling the PTZ camera in accordance with one or more preset non-event settings when no events are detected by any of the plurality of motion detectors.

8. The method of claim 7, wherein the one or more preset settings comprise one or more of a pan setting, a zoom setting, a tilt setting, a resolution setting, a frame rate setting and a bit rate setting, and wherein the method further comprises:

automatically changing one or more of the preset settings to one or more event settings when one or more events are detected by one or more of the plurality of motion detectors; and automatically controlling the PTZ camera in accordance with the one or more event settings when one or more events are detected by one or more of the plurality of motion detectors.

9. The method of claim 1, further comprising:

concurrently detecting two or more objects along the first path in the monitored region, the two or more objects including the first object; and in response to detecting the two or more objects along the first path, automatically controlling the PTZ camera such that the FOV of the PTZ camera includes each of the two or more objects.

10. The method of claim 9, wherein automatically controlling the PTZ camera such that the FOV of the PTZ camera includes each of the two or more objects includes zooming out the FOV of the PTZ camera to includes each of the two or more objects.

* * * * *